(12) United States Patent
Barnes et al.

(10) Patent No.: US 7,805,015 B2
(45) Date of Patent: Sep. 28, 2010

(54) METHOD OF POINT IDENTIFICATION AND TRACKING IN A DIGITAL VIDEO ENVIRONMENT

(75) Inventors: Thomas Henry Barnes, Austin, TX (US); John W. Dunsmoir, Round Rock, TX (US); Sivakumar Jambunathan, Round Rock, TX (US); Sheryl S. Kinstler, Dripping Springs, TX (US); Carol Sue Robertson Walton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1006 days.

(21) Appl. No.: 11/553,496

(22) Filed: Oct. 27, 2006

(65) Prior Publication Data

US 2008/0101715 A1    May 1, 2008

(51) Int. Cl.
    *G06K 9/40*    (2006.01)
(52) U.S. Cl. ...................... 382/264; 382/153
(58) Field of Classification Search ............. 382/264, 382/275, 276, 289
    See application file for complete search history.

(56) References Cited

U.S. PATENT DOCUMENTS 5,579,444 A * 11/1996 Dalziel et al. ............... 700/259

| 5,953,448 A | 9/1999 | Liang |
| 6,442,292 B1 | 8/2002 | Otani et al. |
| 6,594,623 B1 | 7/2003 | Wang et al. |
| 7,016,528 B2 | 3/2006 | Otani et al. |

OTHER PUBLICATIONS

Lu et al "Wavelet fuzzy classification for detecting and tracking region outliers in meteorological data", ACM, GIS'04, Nov., pp. 258-265, 2004.*

* cited by examiner

*Primary Examiner*—Samir A. Ahmed
*Assistant Examiner*—Ruiping Li
(74) *Attorney, Agent, or Firm*—Yee & Associates, P.C.; William H. Steinberg

(57) ABSTRACT

A computer implemented method, apparatus, data processing system, and computer usable program code are provided for identifying interest points. A set of digital images and a set of threshold values are received, where the set of digital images includes a set of digital frames. A set of directional values are calculated for each of a set of pixels within each digital frame in the set of digital frames. A set of interest points are identified within each digital frame in the set of digital frames using the set of threshold values and the set of directional values. Finally, a set of characteristics is identified for the set of interest points.

20 Claims, 4 Drawing Sheets

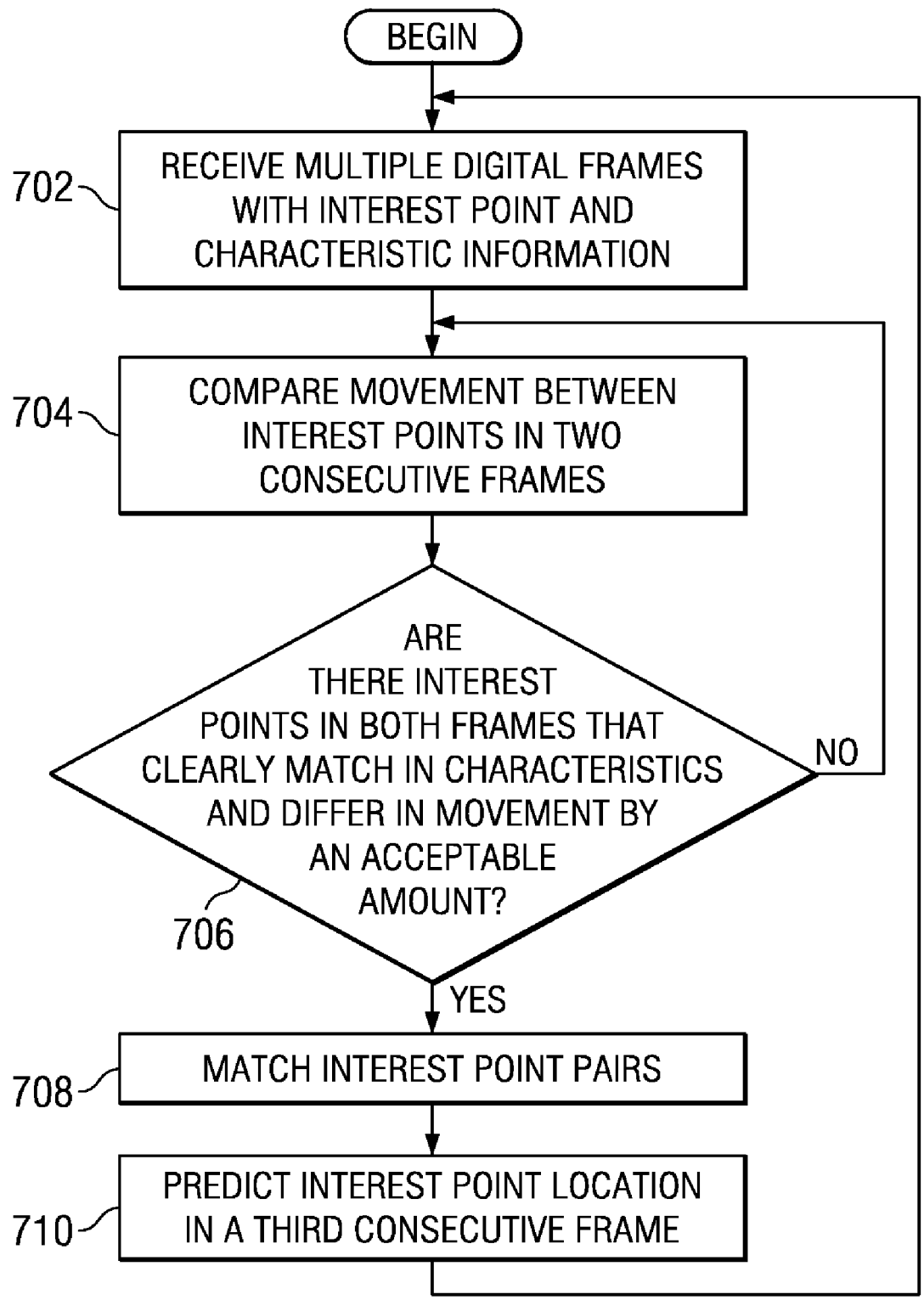

METHOD OF POINT IDENTIFICATION AND TRACKING IN A DIGITAL VIDEO ENVIRONMENT

BACKGROUND OF THE INVENTION

1. Field of the Invention

The present invention relates generally to video identification. More particularly, the present invention relates to a computer implemented method, data processing system, and computer readable program code for identifying a point within a digital video frame and tracking the point from frame to frame.

2. Description of the Related Art

Several methods are currently used to interpret an image within a digital video frame. Some of the most common methods are pattern matching and edge detection. Both methods have been studied at length.

A digital picture consists of pixels which are normally represented by colors comprised of 256 possibilities of red, green and blue. Current applications require precise identification of "Interest Points" such as corners, which can then be tracked accurately and unambiguously from frame to frame. However, in any digital image containing a large number of pixels, no points are clearly defined when the image is analyzed at the pixel level. Corners, that appear to be clearly defined to the naked eye, are simply a fuzzy collection of similar pixels when observed up-close. Edge detection also has this problem, which is overcome by converting to grayscale and applying a Gaussian blur to smooth the differences from pixel to pixel. Edge detection then calculates gradients. Although this method yields excellent results in edge detection, it is very poor at precise identification of points and then the subsequent identification of the same point in the next frame. The reasons why edge detection methods will not work for point identification are:

The Gaussian blur removes any clear identification regarding which pixel is at the corner point.

Gray scale methodologies remove any accurate color identity to track the same point in subsequent frames.

Sharp corners are rounded in edge detection, making clear identification impossible.

Thus, the current technologies lack the capability to accurately identify a point in a digital video frame and track the point from frame to frame.

SUMMARY OF THE INVENTION

The different aspects of the illustrative embodiments provide a computer implemented method, apparatus, data processing system, and computer usable program code for identifying interest points. The illustrative embodiments receive a set of digital images and a set of threshold values. The set of digital images includes a set of digital frames. The illustrative embodiments calculate a set of directional values for each of a set of pixels within each digital frame in the set of digital frames. The illustrative embodiments identify a set of interest points within each digital frame in the set of digital frames using the set of threshold values and the set of directional values. Then, the illustrative embodiments determine a set of characteristics for the set of interest points.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 7 illustrates a flow diagram of the operation performed to track interest points in accordance with an illustrative embodiment.

DETAILED DESCRIPTION OF THE PREFERRED EMBODIMENT

Figure 1:
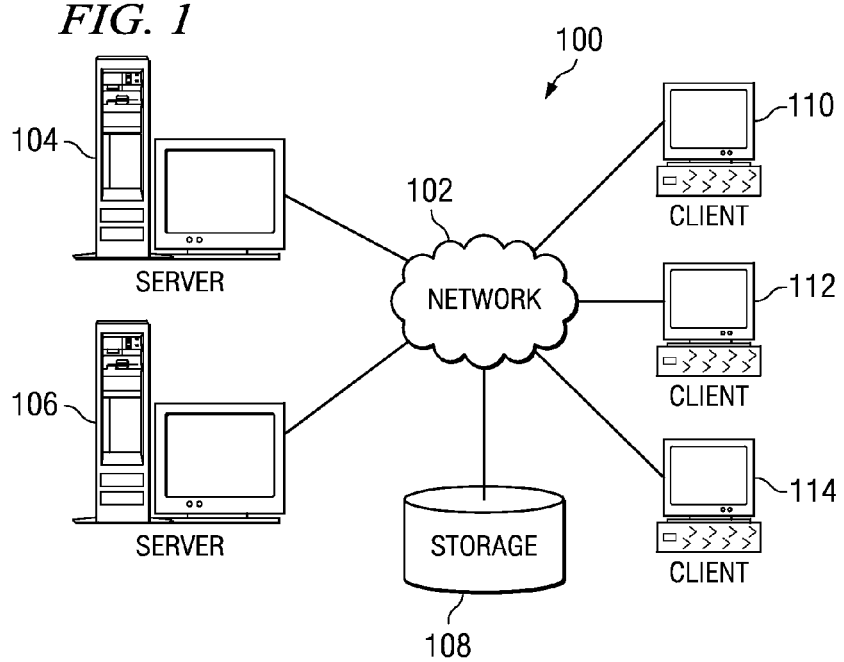
FIG. 1 depicts a pictorial representation of a network of data processing systems in which illustrative embodiments may be implemented.
Figure 2:
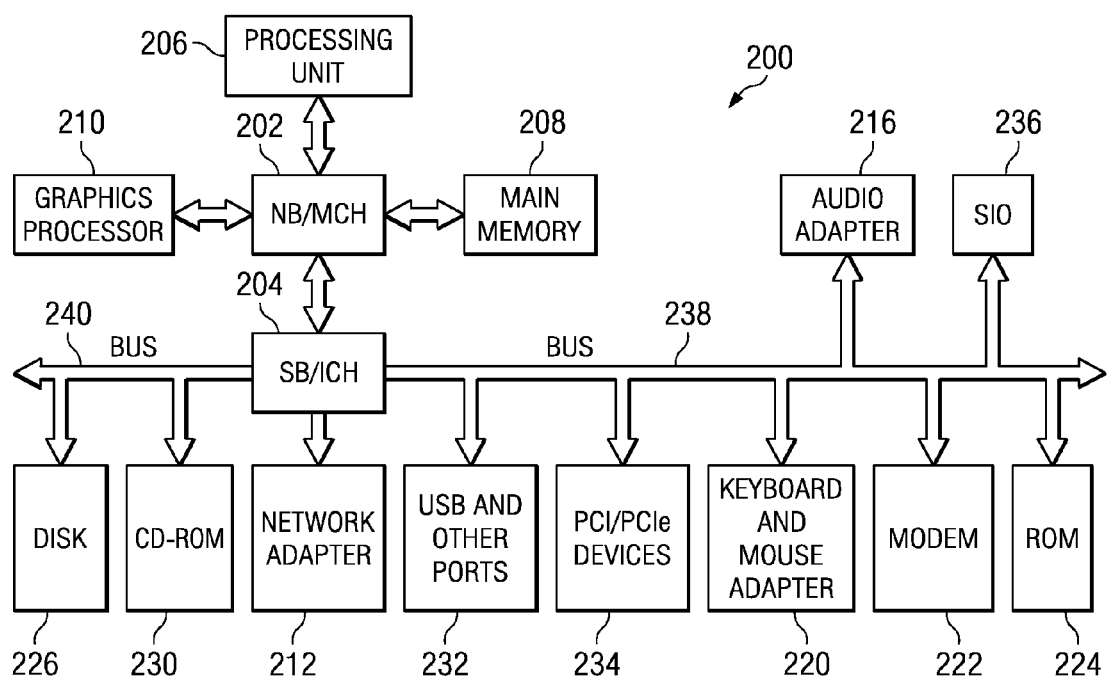
FIG. 2 shows a block diagram of a data processing system in which illustrative embodiments may be implemented.

The illustrative embodiment provide for identifying interest points within a digital video frame and tracking the interest points from frame to frame. With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200. Java and all Java-based trademarks are trademarks of Sun Microsystems, Inc. in the United States, other countries, or both.

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide an alternate method of interpreting a digital video image based on interest point identification from currently used methods. Interest point identification is particularly suitable when the surrounding image is new or unpredictable, and the objects themselves are unpredictable but need tracking. For example, a missile following a predicted path, like a cruise missile, would use GPS and pattern matching primarily. In this case, interest point identification would not add anything. However, a missile fired from one aircraft at another aircraft, which wants to avoid all sorts of confusing counter measures and background images, could use interest point identification to distinguish between the aircraft image and any false image.

Figure 3:
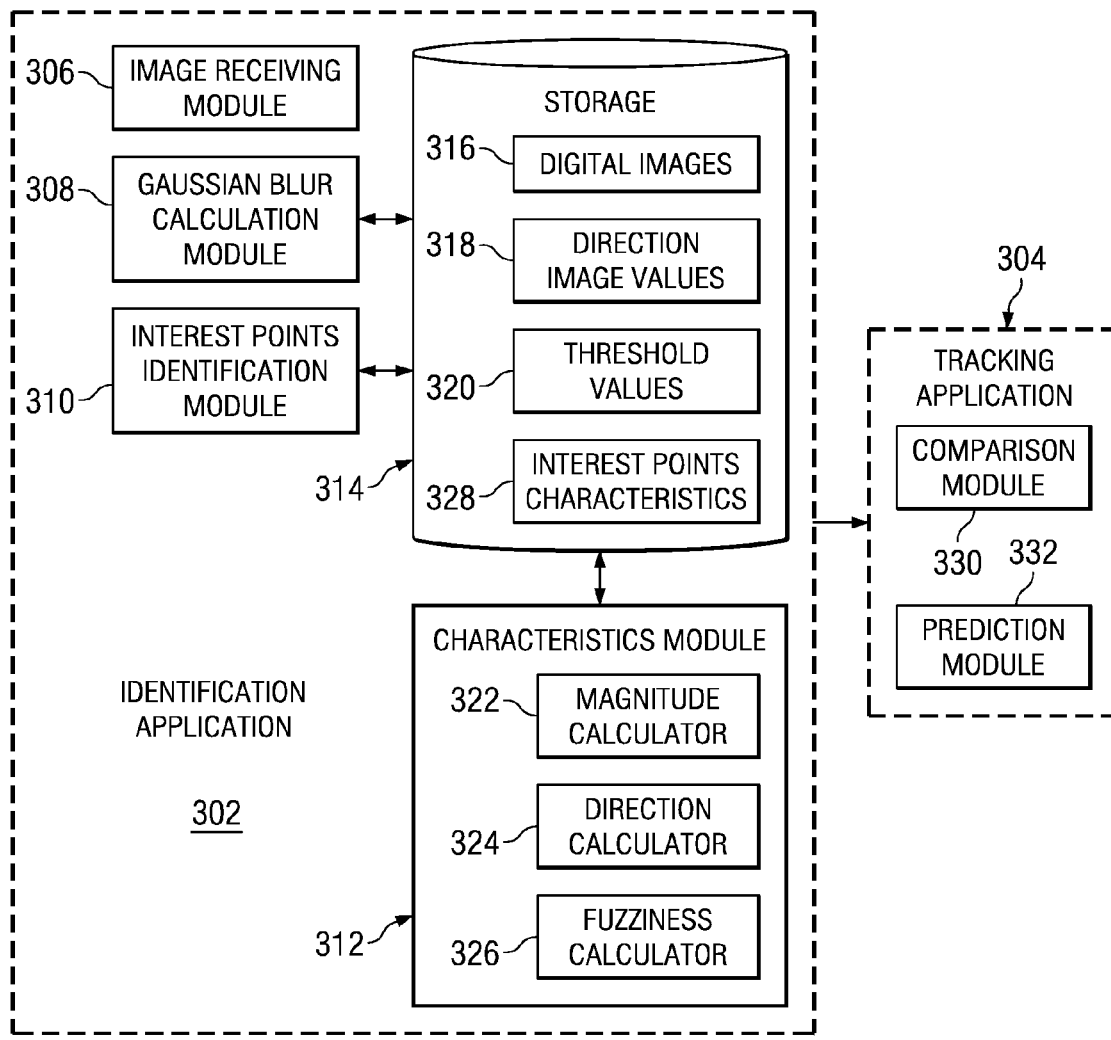
FIG. 3 depicts a functional block diagram of an interest point identification application and interest point tracking application in accordance with an illustrative embodiment.

FIG. 3 depicts a functional block diagram of an interest point identification application and interest point tracking application in accordance with an illustrative embodiment. The interest point identification and tracking applications may be comprised of two different applications, identification application 302 and tracking application 304. Identification application 302 and tracking application 304 are applications that may be executed by a processing unit such as processing unit 206 of FIG. 2. Identification application 302 may comprise image receiving module 306, Gaussian blur calculation module 308, interest points identification module 310, characteristics module 312, and storage 314.

Figure 4:
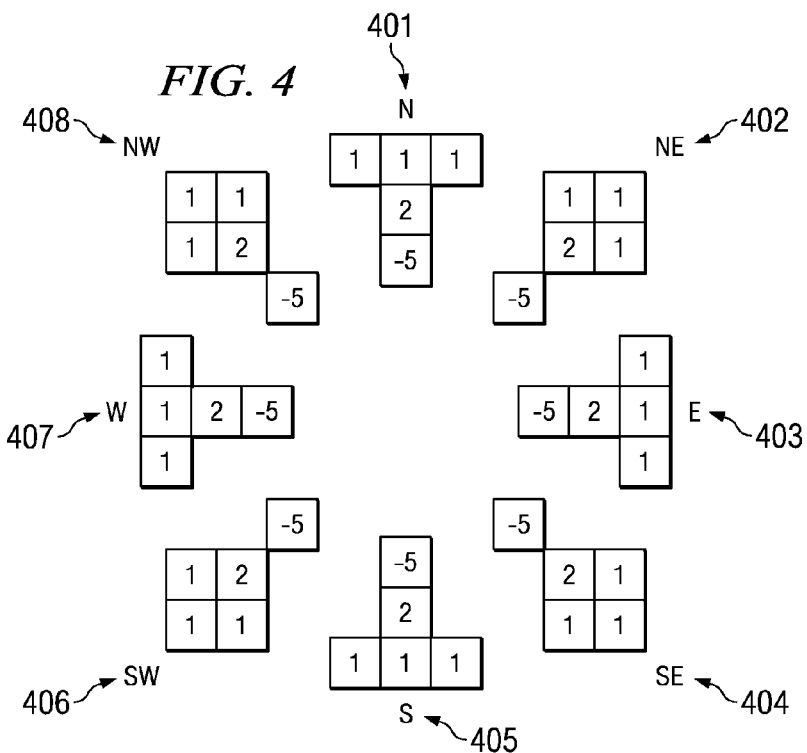
FIG. 4 illustrates the eight Gaussian blur directions that are calculated in accordance with an illustrative embodiment.

In these examples, identification receiving module 306 is a module that receives digital video images from external sources and stores the images as digital video images 316 on storage 314. Gaussian blur calculation module 308 calculates Gaussian blur directional values for each 5×5 matrix of pixels of one frame within digital video images 316. Gaussian blur is a widely used effect in graphics software. Gaussian blur is typically used to reduce image noise and reduce detail levels. Each Gaussian blur may be calculated in eight directions 401-408 as shown in FIG. 4. Each of the directions 401-408 are weighted with a weight value of 1, 2, or −5. The weight value given to each pixel in directions 401-408 will ensure a cumulative value of zero if all the pixels are the same color in any given direction. Each color, red, green, or blue, may be treated separately. Therefore, at the end of the calculation there will be twenty-four values, that is eight different directions and three values representing red, green, and blue for that direction. The Gaussian Blur calculations are stored as direction image values 318 in storage 314.

Returning to FIG. 3, threshold values 320 stored in storage 314 stores two threshold values that are provided by the user. The first or "low" threshold value is used to determine if a direction, such as one of directions 401-408 in FIG. 4, have pixels of the same color. The first threshold value may normally be between +10 and −10 and may be kept constant because there is very little sensitivity in interest point identification to this first threshold value. The second or "high" threshold value is used to determine if a direction has pixels that are significantly different from the central pixel. The second threshold value may usually be a value that is greater than 100 or less than −100. The first threshold value may be varied dynamically to limit the number of pixels that are identified as "Interest Points". Typically, identification application 302 works best if a few hundred interest points are selected as interest points. The second threshold value may be adjusted from frame to frame to keep the number of interest points relatively constant.

The second threshold value may also be calculated in zones of the image to ensure that all areas of the image identify a set of interest points and none of the areas have an excessive number of interest points. The illustrative embodiments use a zoning method that uses horizontal stripes although any zoning method may be used. Using a zoning method ensures that a set of interest points that are selected in low light areas in the image where the contrast is not high and interest points selected higher up in the image will be a manageable number of interest points.

Interest points identification module 310 identifies interest points using direction image values 318 and threshold values 320 associated with a given digital image. An interest point is identified by any pixel in which there are five directions with a value in the second or "high" threshold value zone, and two directions with a value in the first or "low" threshold value zone. The eighth direction may be any value. The eighth value being any value is analogous to standing on a rocky outcrop with flat rock on one side, and a precipice around three sides of the rock. The reason for selecting five directions in the second or "high" threshold value zone is to eliminate the straight edge case. The reason for selecting two directions in the first or "low" threshold value zone is to eliminate the spurious cases that can arise if only one direction exhibits a "low" value.

Figure 5:
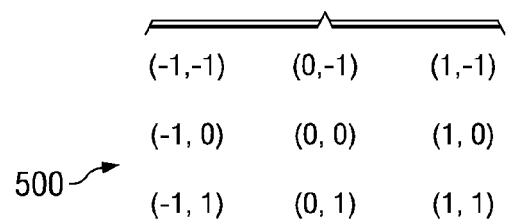
FIG. 5 illustrates a matrix that is used to calculate magnitude and direction of an interest point in accordance with an illustrative embodiment.

Once interest points identification module 310 identifies a potential interest point, characteristics module 312 calculates the characteristics of the interest point. Characteristics calculated by characteristics module 312 using magnitude calculator 322, direction calculator 324, and fuzziness calculator 326 are used to identify the interest point in subsequent digital image frames. A 3×3 matrix is used by magnitude calculator 322 and direction calculator 324 to calculate magnitude and direction of the interest point as shown in FIG. 5. In a potential interest point there are either two or three directions in which the color is constant. Matrix 500 shown in FIG. 5 is used to calculate easily both direction and magnitude of an interest point. Matrix 500 comprises an x component and a y component. Each component is calculated separately by simply selecting those directions which are less than the minimum value. Each direction has an x component that can be either −1, 0, or +1. Additionally, each direction has a y component that can be either −1, 0, or +1. The x components are added and the y components are added. The magnitude is then the square root of x squared plus y squared. The direction is the arc tangent (arctan) y/x. These two values are used to distinguish points as well as the color value, red, green, and blue, of the point. No other solution has this directional capability.

This information is used to distinguish the same point in subsequent frames accurately. Thus, matrix 500 is used to calculate the average direction of these directions, and the magnitude of the skew. Interest points with a low magnitude and skew will be eliminated. This will occur when there is no clear directional bias.

Next, the "fuzziness" of the interest point is calculated using fuzziness calculator 326 by looking at the interest points surrounding the potential interest point. If there are any other interest points in this matrix that have similar interest point characteristics, the strongest will be selected and the others will be eliminated.

The following identifying characteristics will be stored as interest points characteristics 328 in storage 314 for each selected interest point:

Characteristics for each of the color (red, green, and blue) values of the selected interest point.

Direction of the selected interest point.

Magnitude of the selected interest point.

Fuzziness of the selected interest point, that is, how many interest points around the selected interest point were eliminated.

The best selected interest points are those interest points with the highest magnitude and direction, and the lowest fuzziness factor.

The illustrative embodiments do not store characteristics based on the values of the "high" directions. The characteristic values in the "high" direction are representative of background color which may change significantly from frame to frame. However, the "low" directions are representative of the moving object itself and should not change significantly from frame to frame.

Environments where there is significant lighting change from frame to frame can be tracked by comparing the ratios of the color values. The color values are values for the red, green, and blue colors of the additive light model, which are combined in various ways to reproduce other colors. If the color values all decrease proportionately, then it is the same color value but in different lighting conditions.

Once interest points have been identified in at least two frames, tracking application 304 may track interest points between the frames. Tracking application 304 comprises comparison module 330 and prediction module 332. In an initial case, there is no history between the two frames and the calculation must be done for every pixel in the first and second frames. Once a general movement is known and a set of interest points have been identified, subsequent frames may be processed incrementally with relatively low compute power and the initial calculation only needs to be done, such as every second or so, to reset the image.

In the initial case, interest points are identified in both images by identification application 302 and then comparison module 330 compares the interest point characteristics of the interest points between the two frames. Interest points that clearly match in characteristics and which move an acceptable number of pixels, are paired. Other interest points are discarded. If there are five hundred interest points identified in each image and one hundred interest points are identified as clearly matching, most applications will consider the one hundred matching interest points as sufficient. The number of interest points that are identified and match may be controlled dynamically from frame to frame by simply altering the first or "high" threshold value.

In the subsequent case, after two frames have been analyzed, only the identified interest points are processed. The location of each interest point may be predicted by prediction module 332 to within a few pixels in the next consecutive frame.

Figure 6:
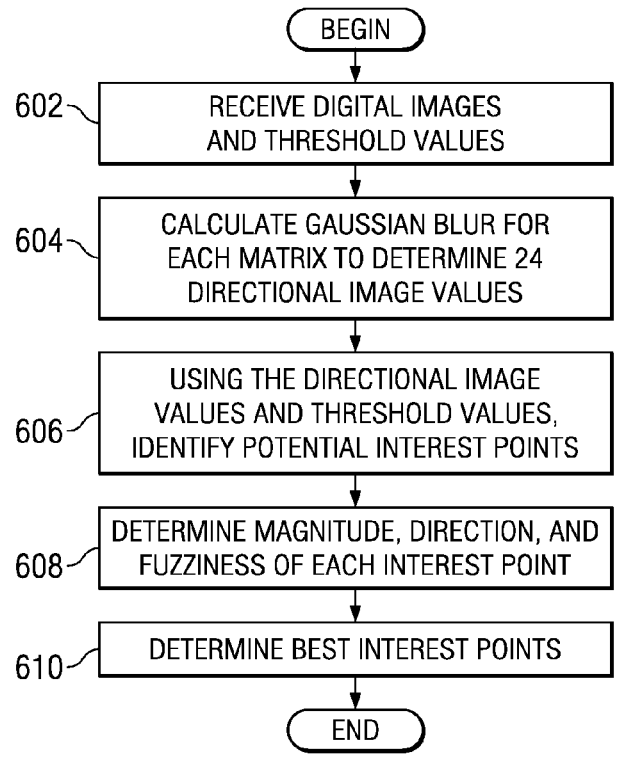
FIG. 6 illustrates a flow diagram of the operation performed to identify interest points in accordance with an illustrative embodiment.

FIG. 6 illustrates a flow diagram of the operation performed to identify interest points in accordance with an illustrative embodiment. As the operation begins, an identification application, such as identification application 302 of FIG. 3, receives a set of digital images, which includes a set of digital frames, and a set of threshold values (step 602). The set of digital images may be one or more digital images and the set of digital frames may be one or more digital frames. The set of threshold values may be one or more threshold values. Gaussian blur directional values are calculated for each 5×5 matrix of a set of pixels in the digital frame to determine twenty-four direction image values for each matrix (step 604). The set of pixels may be one or more pixels. Each Gaussian blur may be calculated in eight directions. Each of the directions is weighted with a weight value of 1, 2, or −5. The weight value given to each pixel will ensure a cumulative value of zero if all the pixels are the same color in any given direction. Each color, red, green, or blue, may be treated separately. Therefore, at the end of the calculation there will be twenty-four values, that is eight different directions and three values representing red, green, and blue for that direction.

Using the directional image values and the threshold values, a set of potential interest points is identified (step 606). The set of potential interest points may be one or more interest points. An interest point is identified by any pixel in which there are five directions with a value in the second or "high" threshold value zone, and two directions with a value in the first or "low" threshold value zone. The eighth direction may be any value. Once potential interest points are identified, a set of characteristics, such as magnitude, direction, and fuzziness characteristics, are calculated for each potential interest point (step 608). The set of characteristics may be one or more characteristics. Using the determined characteristics, the best interest points are selected from the potential interest points (step 610), with the operation terminating thereafter. The best selected interest points are those interest points with the highest magnitude and direction, and the lowest fuzziness factor.

FIG. 7 illustrates a flow diagram of the operation performed to track interest points in accordance with an illustrative embodiment. As the operation begins, a tracking application, such as tracking application 304 of FIG. 3, receives multiple digital frames with interest points and characteristics (step 702). The interest points are compared between two consecutive frames to determine movement of an interest point (step 704). Interest points that clearly match in characteristics and which move an acceptable number of pixels, are paired. A determination is made as to whether there are two interest points that clearly match in characteristics and differ in movement by an acceptable amount (step 706). If there is no match between two interest points, then the operation returns to step 704. If two interest points clearly match in characteristics and differ in movement by an acceptable amount, then the interest points are paired (step 708). Once two interest points are paired, a prediction is made as to the location of an interest point in a third consecutive frame (step 710). The operation then returns to step 702, where the operation of tracking continues.

Thus, the illustrative embodiments provide a new technology that retains the proven techniques in edge detection but overcomes the weaknesses of edge detection. In particular, the illustrative embodiments identify corners precisely, to within one pixel and provide enough information so that the same interest point can be identified unambiguously in subsequent frames. Interest point identification as described in the illustrative embodiments may best be used when pattern matching and edge detection cannot produce acceptable results. Exemplary application of interest point applications might be: military applications, motor vehicle applications, navigation applications augmenting the capabilities of GPS, applications to help the visually impaired, security applications, and area management applications, such as parking lots.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, or transport the program for use by or in connection with the instruction execution system, apparatus, or device.

The medium can be an electronic, magnetic, optical, electromagnetic, infrared, or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for identifying interest points, the computer implemented method comprising:
receiving a set of digital images and a set of threshold values, wherein the set of digital images includes a set of digital frames;
calculating a number of directional values for each pixel in a set of pixels within each digital frame in the set of digital frames to form a number of directional values, wherein the number of directional values calculated are at least eight directional values and wherein the at least eight directional values comprise eight different directions of each pixel;
identifying, by a processing unit, a set of interest points within each digital frame in the set of digital frames using the set of threshold values and the number of directional values, wherein each interest point in the set of interest points is identified by a pixel within the set of pixels comprising two directional values of the number of directional values that are within a first threshold value from the set of threshold values and five directional values of the number of directional values that are within a second threshold value from the set of threshold values and wherein the first threshold value is a range of directional values that is closer to a value of the pixel than a range of directional values of the second threshold value; and
determining a set of characteristics for the set of interest points.

2. The computer implemented method of claim 1, wherein the number of directional values are Gaussian blur directional values.

3. The computer implemented method of claim 1, wherein the number of directional values are twenty-four directional values and wherein the twenty-four directional values comprise eight different directions for each of three values representing red, green, and blue colors.

4. The computer implemented method of claim 1, wherein the set of characteristics comprises at least one of a magnitude characteristic, a direction characteristic, and a fuzziness characteristic.

5. The computer implemented method of claim 4, further comprising:
selecting a set of best interest points within the set of interest points, wherein the set of best interest points are determined by an interest point whose magnitude and direction characteristics are high values and fuzziness characteristic is a low value.

6. The computer implemented method of claim 1, further comprising:
comparing a first interest point in a first digital frame within the set of digital frames and a second interest point in a second digital frame within the set of digital frames;
determining if the first interest point and the second interest point have matching characteristics and a difference in movement by a predetermined amount;
responsive to a presence of matching characteristics, pairing the first interest point with the second interest point; and
predicting the location of a third interest point in a third digital frame using the difference in movement between the first interest point and the second interest point.

7. The computer implemented method of claim 6, wherein the first digital frame, the second digital frame, and the third digital image frames are consecutive frames.

8. A data processing system comprising:
a bus system;
a communications system connected to the bus system;
a memory connected to the bus system, wherein the memory includes a set of instructions; and
a processing unit connected to the bus system, wherein the processing unit executes the set of instructions to receive a set of digital images and a set of threshold values, wherein the set of digital images includes a set of digital frames; calculate a number of directional values for each pixel in a set of pixels within each digital frame in the set of digital frames to form a number of directional values, wherein the number of directional values calculated are at least eight directional values and wherein the at least eight directional values comprise eight different directions of each pixel; identify a set of interest points within each digital frame in the set of digital frames using the set of threshold values and the number of directional values wherein each interest point in the set of interest points is identified by a pixel within the set of pixels comprising two directional values of the number of directional values that are within a first threshold value from the set of threshold values and five directional values of the number of directional values that are within a second threshold value from the set of threshold values and wherein the first threshold value is a range of directional values that is closer to a value of the pixel than a range of directional values of the second threshold value; and determine a set of characteristics for the set of interest points.

9. The data processing system of claim 8, wherein the number of directional values are Gaussian blur directional values, wherein the number of directional values are twenty-four directional values, and wherein the twenty-four directional values comprise eight different directions for each of three values representing red, green, and blue colors.

10. The data processing system of claim 8, wherein the set of characteristics comprises at least one of a magnitude characteristic, a direction characteristic, and a fuzziness characteristic.

11. The data processing system of claim 10, wherein the processing unit executing the set of instructions to select a set of best interest points within the set of interest points, wherein the set of best interest points are determined by an interest point whose magnitude and direction characteristics are high values and fuzziness characteristic is a low value.

12. The data processing system of claim 8, wherein the processing unit executing the set of instructions to compare a first interest point in a first digital frame within the set of digital frames and a second interest point in a second digital frame within the set of digital frames; determine if the first interest point and the second interest point have matching characteristics and a difference in movement by a predetermined amount; pair the first interest point with the second interest point in response to a presence of matching characteristics; and predict the location of a third interest point in a third digital frame using the difference in movement between the first interest point and the second interest point, wherein the first digital frame, the second digital frame, and the third digital image frames are consecutive frames.

13. A computer program product comprising:
a non-transitory computer readable storage medium including computer usable program code for identifying interest points, the computer program product comprising:
computer usable program code for receiving a set of digital images and a set of threshold values, wherein the set of digital images includes a set of digital frames;
computer usable program code for calculating a number of directional values for each pixel in a set of pixels within each digital frame in the set of digital frames to form a number of directional values, wherein the number of directional values calculated are at least eight directional values and wherein the at least eight directional values comprise eight different directions of each pixel;
computer usable program code for identifying a set of interest points within each digital frame in the set of digital frames using the set of threshold values and the number of directional values, wherein each interest point in the set of interest points is identified by a pixel within the set of pixels comprising two directional values of the number of directional values that are within a first threshold value from the set of threshold values and five directional values of the number of directional values that are within a second threshold value from the set of threshold values and wherein the first threshold value is a range of directional values that is closer to a value of the pixel than a range of directional values of the second threshold value; and
computer usable program code for determining a set of characteristics for the set of interest points.

14. The computer program product of claim 13, wherein the number of directional values are Gaussian blur directional values, wherein the number of directional values are twenty-four directional values, and wherein the twenty-four directional values comprise eight different directions for each of three values representing red, green, and blue colors.

15. The computer program product of claim 13, wherein the set of characteristics comprises at least one of a magnitude characteristic, a direction characteristic, and a fuzziness characteristic.

16. The computer program product of claim 15, further comprising:
computer usable program code for selecting a set of best interest points within the set of interest points, wherein the set of best interest points are determined by an interest point whose magnitude and direction characteristics are high values and fuzziness characteristic is a low value.

17. The computer program product of claim 13, further comprising:
computer usable program code for comparing a first interest point in a first digital frame within the set of digital frames and a second interest point in a second digital frame within the set of digital frames;
computer usable program code for determining if the first interest point and the second interest point have matching characteristics and a difference in movement by a predetermined amount;
computer usable program code for pairing the first interest point with the second interest point in response to a presence of matching characteristics; and
computer usable program code for predicting the location of a third interest point in a third digital frame using the difference in movement between the first interest point and the second interest point, wherein the first digital frame, the second digital frame, and the third digital image frames are consecutive frames.

18. A computer comprising:
a processing unit, wherein the processing unit executes instructions for a set of modules and wherein the set of modules comprises:
an image receiving module that receives a set of digital images and a set of threshold values, wherein the set of digital images includes a set of digital frames;
a calculation module that calculates a number of directional values for each pixel in a set of pixels within each digital frame in the set of digital frames to form a number of directional values, wherein the number of directional values calculated are at least eight directional values and wherein the at least eight directional values comprise eight different directions of each pixel;
an interest point identification module that identifies a set of interest points within each digital frame in the set of digital frames using the set of threshold values and the number of directional values, wherein each interest point in the set of interest points is identified by a pixel within the set of pixels comprising two directional values of the number of directional values that are within a first threshold value from the set of threshold values and five directional values of the number of directional values that are within a second threshold value from the set of threshold values and wherein the first threshold value is a range of directional values that is closer to a value of the pixel than a range of directional values of the second threshold value; and
a characteristics module that determines a set of characteristics for the set of interest points.

19. The computer of claim 18, wherein the set of modules further comprises:
a comparison module that compares a first interest point in a first digital frame within the set of digital frames and a second interest point in a second digital frame within the set of digital frames, determines if the first interest point and the second interest point have matching characteristics and a difference in movement by a predetermined amount, and responsive to a presence of matching characteristics, pairs first interest point with the second interest point; and
a prediction module that predicts the location of a third interest point in a third digital frame using the difference in movement between the first interest point and the second interest point, wherein the first digital frame, the second digital frame, and the third digital image frames are consecutive frames.

20. The computer of claim 18, wherein the number of directional values are Gaussian blur directional values, wherein the number of directional values are twenty-four directional values, wherein the twenty-four directional values comprise eight different directions for each of three values representing red, green, and blue colors, and wherein the set of characteristics comprises at least one of a magnitude characteristic, a direction characteristic, and a fuzziness characteristic.

* * * * *